United States Patent
Daniel et al.

(10) Patent No.: US 8,272,985 B2
(45) Date of Patent: Sep. 25, 2012

(54) POWER TRANSMISSION MECHANISM (75) Inventors: Benjamin Daniel, Pforzheim (DE); Thorsten Krause, Buehl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 518 days.

(21) Appl. No.: 12/315,561

(22) Filed: Dec. 4, 2008

(65) Prior Publication Data

US 2009/0145712 A1  Jun. 11, 2009

(30) Foreign Application Priority Data

Dec. 10, 2007 (DE) .................. 10 2007 059 405

(51) Int. Cl.
*F16H 3/72* (2006.01)

(52) U.S. Cl. ............................ 475/5; 192/3.3
(58) Field of Classification Search ............. 475/5, 23, 475/92; 192/3.3, 113.26, 113.25, 3.29, 70.17, 192/113.36
See application file for complete search history.

(56) References Cited

U.S. PATENT DOCUMENTS

| | | | |
|---|---|---|---|
| 6,332,521 B1 * | 12/2001 | Shoji | 192/55.61 |
| 6,695,110 B2 * | 2/2004 | Maienschein et al. | 192/3.3 |
| 7,017,724 B2 * | 3/2006 | Hayabuchi et al. | 192/70.17 |
| 7,222,706 B2 * | 5/2007 | Tomiyama | 192/3.29 |
| 7,223,202 B2 * | 5/2007 | Tryon et al. | 477/5 |
| 7,226,384 B2 * | 6/2007 | Tryon et al. | 477/5 |
| 7,232,402 B2 * | 6/2007 | Tryon et al. | 477/5 |
| 7,264,101 B2 * | 9/2007 | Hauck et al. | 192/55.61 |
| 7,431,138 B2 * | 10/2008 | Heinrich et al. | 192/85.39 |
| 2004/0144607 A1 * | 7/2004 | Back et al. | 192/3.3 |
| 2005/0199461 A1 * | 9/2005 | Zuehl | 192/3.29 |
| 2007/0181396 A1 * | 8/2007 | Maienschein et al. | 192/3.29 |
| 2008/0083594 A1 * | 4/2008 | Degler et al. | 192/3.29 |

FOREIGN PATENT DOCUMENTS

| | | | |
|---|---|---|---|
| DE | 4433256 A1 | 5/1995 | |
| DE | 102006028557 A1 | 1/2007 | |

* cited by examiner

*Primary Examiner* — Hau Phan
(74) *Attorney, Agent, or Firm* — Simpson & Simpson, PLLC (57) ABSTRACT

A power transmission mechanism for transmitting power between a driving engine and an output drive, including: an input and an output; a hydrodynamic component with a pump wheel and a turbine wheel; an apparatus for at least partially bridging over the hydrodynamic component, the apparatus including a control device with a piston element that is chargeable with pressurizing agent; an influencing element for influencing a difference in speeds of rotation of moving fluids on both sides of the piston element, the influencing element rotatable in rotational synchronicity with the piston element, which extends outward in the radial direction free of any direct connection with the piston element, and which is situated in the radial direction at least in the range of the outside diameter, forming at least part of an axial space with the piston element.

16 Claims, 5 Drawing Sheets

Prior Art

Fig. 5b

POWER TRANSMISSION MECHANISM

CROSS-REFERENCE TO RELATED APPLICATIONS

This application claims priority from German Patent Application No. 10 2007 059 405.6, filed on Dec. 10, 2007, which application is incorporated herein by reference.

FIELD OF THE INVENTION

The invention relates to a power transmission mechanism, in particular for transmitting power between a driving engine and an output drive, including a hydrodynamic component and an apparatus for at least partially bridging over the hydrodynamic components.

BACKGROUND OF THE INVENTION

A power transmission component including a hydrodynamic speed variator/torque converter and a lockup clutch is previously known for example from published patent DE 44 33 256 A1. The power transmission mechanism includes an input that is connected to a driving engine with a rotationally fixed connection. This is formed for example by a housing with a wall that runs at least approximately radially. The lockup clutch situated between the latter and the turbine wheel of the speed variator/torque converter includes at least one lamina that is rotationally connected to the turbine wheel, and may be brought into operative connection on the one hand with the housing and on the other hand with an axially movable piston situated between the housing and the turbine wheel, with a hydraulic pressure acting on the piston. A first chamber chargeable with pressurizing agent, which serves to engage the clutch, is situated between the piston and the turbine wheel. Another second chamber chargeable with pressurizing agent, for disengaging the lockup clutch, is provided between the housing wall and the piston. In the first and second chambers chargeable with pressurizing agent, means are provided for reducing the difference in speed of rotation between the lower rotational speed of the flow medium present in the pressure chamber between turbine and piston in acceleration mode with the lockup clutch disengaged or slipping, and the higher rotational speed of the flow medium prevailing in the pressure chamber between piston and housing. This is realized for example by elongating laminae of the lockup clutch radially inward and giving them a slightly shovel-like shape.

To improve the engagement of the lockup clutch, from DE 10 2006 028 557 A1 according to a further development of the means for reducing the rotational speed it is known that the piston element of the actuating mechanism of the lockup clutch, which is connected to the housing by means of a coupling spring device so that it is rotationally fixed but movable in the axial direction, has flow guiding means which influence the rotational speed of a moving fluid between the piston and the turbine wheel, which is intended to cause a more rapid rise in the rotational speed of the moving fluid between the piston and the turbine wheel and thus of the dynamic pressure at the beginning of the engagement of the lockup clutch.

In general, however, for 3-channel versions of the power transmission mechanism when used in vehicles the problem exists of being able to ensure clean and jerk-free regulation of the lockup clutch, due to the hydrodynamic influences of moving fluids.

BRIEF SUMMARY OF THE INVENTION

The object of the invention is to refine a power transmission mechanism of the type named above so that a further improvement is achieved in the connecting behavior of a lockup clutch specifically in a configuration having an actuating mechanism that may be subjected to any desired pressure, as well as a reduction of the hydrodynamic influences on the lockup clutch, which can result in self-closure of the latter, using especially simple means.

For a power transmission mechanism designed according to the invention, in particular for transmitting power between a driving engine and an output drive, including at least an input and an output, a hydrodynamic component with a pump wheel and a turbine wheel and an apparatus for at least partially bridging over the hydrodynamic component having a control device with a piston element that is chargeable with pressurizing agent and having means for influencing the difference in speed of rotation of moving fluids on both sides of the piston element, the means includes an influencing element that is coupled with the piston element so that it is rotationally synchronous with but free of any direct connection to the latter, and which extends outward in the radial direction and is situated in the radial direction at least in the range of the outer diameter, forming an axial interval zone from the piston element.

The solution according to the invention makes it possible to effectively shield the piston element from axial forces resulting from the hydrodynamic effects, in particular by shifting the support of the axial force resulting from the hydrodynamic effects from the piston element to a different element with simple means, free of additional modification efforts for the additional sub-assemblies.

The influencing element can be designed in various ways. The decisive factor is that this moving fluid which is present in the intermediate space provided between influencing element and piston element produces a dragging effect that reduces the rotational speed of the moving fluid to the rotational speed of the piston.

According to a one embodiment, the influencing element may be designed as a disk-shaped or ring-shaped element which, for example, has a surface that is completely closed in the circumferential direction. Such additional elements can be integrated into the power transmission mechanism in a manner that saves construction space especially well.

According to another embodiment, the influencing element can be designed as a formed element, for example, as a conically shaped element, when viewed in cross section. The element is present in general as a formed sheet metal part, in particular a deep drawn part, from the disk-shaped semifinished material. The formed element has a connecting zone in the area of the inner circumference, which is used to make a rotationally fixed connection with a connecting element and which has an inclined contour in the axial direction when viewed in cross section, i.e., with a constant or non-constant change in diameter, forming an annular sleeve. In this manner the stiffness of the component is increased and the risk of abrasion reduced.

The influencing element is free of any direct coupling with the piston element, so that no supporting of the axial forces on the piston element occurs. To that end, the influencing element has a rotationally fixed connection with an element that has a rotationally fixed connection with the piston element.

A plurality of possibilities exist with regard to the construction of the power transmission mechanism. The possibilities include at least a 2-channel or 3-channel unit. These units comprise at least two connections, a first connection coupled with a working chamber of the hydrodynamic component and a second connection coupled with a space bounded by a housing and the outer circumference of the hydrodynamic component and fillable with process fluid. When designed as a 3-channel unit an additional third connection is provided, coupled with a space assigned to the piston element and fillable with pressurizing agent, the piston element being guided at the input or an element rotationally fixed to the latter, with a pressure-tight and fluid-tight seal.

Various options are available for arranging the influencing element, depending on the design of the power transmission mechanism. In a one embodiment, the influencing element is situated between the piston element and the turbine wheel of the hydrodynamic component, viewed in the axial direction between input and output. If a device for damping vibrations is provided which is situated between piston element and turbine wheel of the hydrodynamic component, viewed in the axial direction between input and output, the influencing element is, for example, placed, viewed in the axial direction between input and output, between the piston element and the device for damping vibrations, or otherwise between the device for damping vibrations and the turbine wheel of the hydrodynamic component. These arrangements normally do not involve any additional construction space requirement in the axial direction, the available construction space in the axial direction being sufficient for the function of the influencing element.

According to another embodiment, the influencing element is utilized between the piston element and the housing or input of the power transmission mechanism.

To that end, the influencing element has a rotationally fixed connection with an element that has a rotationally fixed connection with the piston element. Depending on the version, this may be the input, a component with a rotationally fixed connection thereto, or the output or a component with a rotationally fixed connection thereto.

BRIEF DESCRIPTION OF THE SEVERAL VIEWS OF THE DRAWING

The solution according to the invention will be explained below on the basis of figures. They depict the following details.

DETAILED DESCRIPTION OF THE INVENTION

Figure 1A:
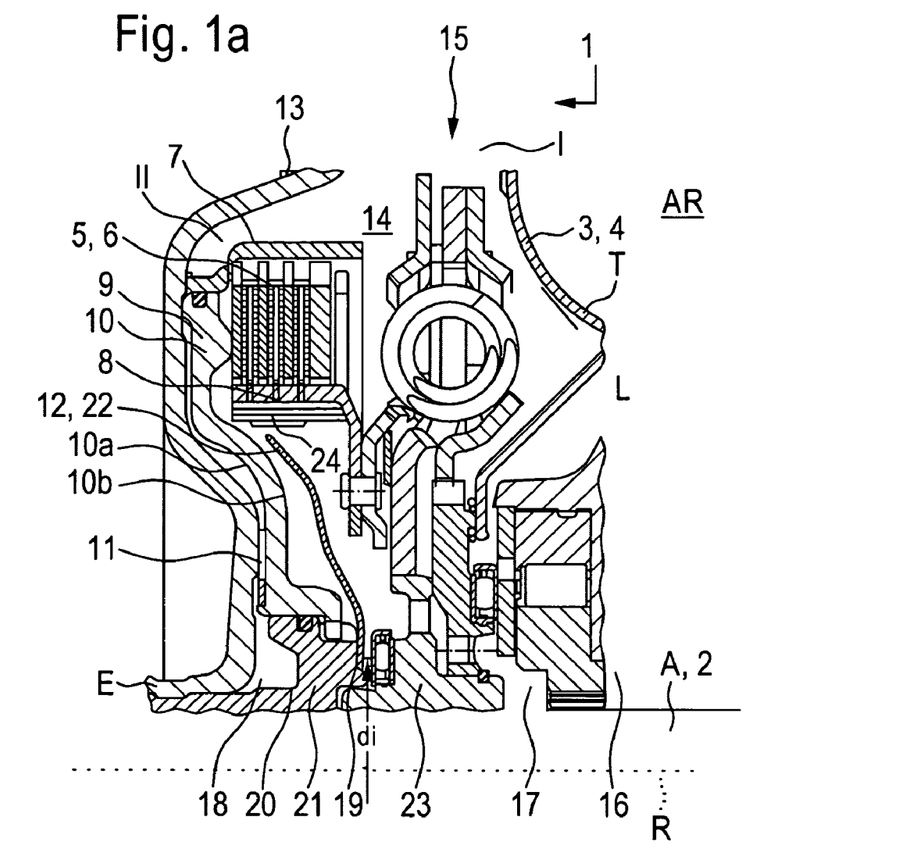
FIG. 1a: illustrates a power transmission mechanism with influencing element integrated according to the invention, in axial sectional view.

FIG. 1a illustrates, in a schematically simplified depiction in an axial sectional view, a power transmission mechanism 1 designed according to the invention for use in power trains, in particular in power trains of vehicles, between a driving engine and an output drive. The output drive is normally formed by a transmission, not depicted here. Power transmission mechanism 1 assumes the function of power transmission, as well as of a speed variator/torque converter within certain bounds. To that end, power transmission mechanism 1 has at least one input E and one output A. Input E is couplable at least indirectly with a driving engine, not shown here, while output A can be connected to a take-off, normally the gear unit downline from the power transmission mechanism 1. Situated between input E and output A is a hydrodynamic component 3. The latter includes at least one primary wheel (not shown) which functions as a pump wheel when power is transmitted between input E and output A, and one secondary wheel which functions as turbine wheel when power is transmitted from input E to output A, where the pump wheel P is connected to input E in a rotationally fixed connection in this functional state, for example, being coupled with the latter in a rotationally fixed connection or constituting it. Furthermore, turbine wheel T is connected to output A at least indirectly, that is, either directly or indirectly through additional transmission elements. Output A is formed for example by hub element 23 which is couplable with transmission input shaft 2, or depending on the configuration, even by transmission input shaft 2 itself. If hydrodynamic component 3 is designed as a hydrodynamic speed variator/torque converter 4, the latter also includes at least one reaction element in the form of a guide wheel L. In that case, a rotational speed variation and a torque conversion take place simultaneously through hydrodynamic component 3. In the case of a design as a hydrodynamic clutch free of a guide wheel, only torque conversion occurs.

Power transmission mechanism 1 further includes at least one apparatus 5 for at least partial bridging of hydrodynamic component 3, i.e., bypassing the power torque path through the hydrodynamic component. The apparatus 5 is executed as a switchable clutch device 6, and is normally referred to as a lockup clutch. "At least partial bridging" in this case means that parallel transmission of power can occur both through hydrodynamic component 3 and through apparatus 5. Apparatus 5 is, for example, designed as a frictionally engaged clutch. In its most common form the latter is constructed in the form of a disk clutch, in particular in the form of a multi-plate clutch. To that end, switchable clutch device 6 includes a first clutch part 7 and a second clutch part 8, which can be brought at least indirectly into operative connection with each other. At least indirectly in this case means either directly or through additional transmission elements. In the case of construction as a frictionally engaged clutch, both clutch parts 7, 8 each include at least one or more elements that carry or constitute frictional surfaces, which are connected to the connecting elements with rotationally fixed connections and can be brought into operative connection with each other. To that end, apparatus 5 includes an actuating mechanism 9, including a piston element 10 which is chargeable with pressurizing agent and is actuated by way of a chamber 11 which is chargeable with pressurizing agent. The individual components are constructed in such a way that they are each able to describe a power branch, the power branches being connectable so that they are functionally parallel or partially in series, depending on the design of apparatus 5 in particular, for at least partial bridging. A first power branch I is realized here through hydrodynamic component 3. To that end, the pump wheel is at least indirectly connected to input E of power transmission mechanism 1 with a rotationally fixed connection, or it constitutes this input. Preferably the coupling is executed through a housing cover 13 that is coupled in a rotationally fixed connection with the pump wheel or is constructed in a single piece, which housing cover encloses the turbine wheel T and also the switchable clutch device 6 in the circumferential direction and in the axial direction, forming an interior space 14.

The output of hydrodynamic component 3 in power branch I when power is being transmitted through hydrodynamic component 3 is formed by turbine wheel T, and has a rotationally fixed connection with output A, either directly or through additional transmitting elements, for example in the form of interposed devices for damping vibrations, which are identified here by 15 by way of example.

The second power branch II contains the power transmission from input E to output A observed through apparatus 5, for at least partial circumvention of the power stream via hydrodynamic component 3, whereby the main range here preferably being characterized by complete bridging. The power is then transmitted purely mechanically, free of any power transmission through the hydrodynamic component. In the depicted example, the latter is also positioned after device 15 to damp vibrations in the power stream.

The design depicted in FIG. 1a is what is known as a three-channel version of a power transmission mechanism 1. It is characterized by at least three connections. A first connection 16 is coupled at least indirectly with the working chamber AR of hydrodynamic component 3, a second connection 17 is connected at least indirectly, i.e., directly or indirectly through additional elements to interior space 14, while third connection 18 is coupled with the chamber 11, which is chargeable with pressurizing agent. Depending on the actuation, a different direction of flow through hydrodynamic component 3 can be realized through the two connections 16 and 17, with the flow passing through hydrodynamic component 3 either centrifugally or centripetally, depending on the pressure circumstances prevailing there. With centrifugal flow-through, a quasi external circulation forms outside of the working chamber AR, outside of the flow circuit in the working chamber AR, through which for example a cooling of the process fluid of the hydrodynamic component occurs during operation of the latter, in particular when power is being transmitted via hydrodynamic power branch I. In the other case, with centripetal flow-through, the circulation in the working chamber AR is maintained to transmit power; at the same time, it is also possible here to maintain an external cooling oil flow. Connections 16 and 17 are coupled in this case with a pressurizing agent supply and/or conveyance system. This can be designed in many different ways. To that end, means are also provided in the latter to control the pressure conditions at the individual connections 16 and 17. Furthermore, connection 18 can also be coupled with the same pressurizing agent supply and/or conveyance system, or otherwise with a separate system. The decisive point is that the pressure in the chamber 11 which is chargeable with pressurizing agent is freely adjustable, i.e., independent of the circumstances in the other chambers that are chargeable with pressurizing agent.

Chamber 11, which is chargeable with pressurizing agent, is bounded here by piston element 10, in that the latter is coupled with a pressure-tight and fluid-tight seal to housing cover 13 or to an element that is coupled to the latter with a rotationally fixed connection, or coupled directly to input E. This coupling causes piston element 10 to rotate at exactly the same rotational speed as housing cover 13. If hydrodynamic component 3 is now accelerated by the driving engine while apparatus 5 is in the non-actuated state, a certain centrifugal oil pressure profile comes about between housing cover 13 and piston element 10, depending on the speed of rotation, which, in the event that the pressures acting on the two oppositely-oriented faces 10a and 10b of piston element 10 are unequal and in the event that an axial force $F_{res-axial}$ resulting therefrom exists, leads to a bracing of the resulting axial force on piston element 10, and this can result in a self-closing effect or to connecting problems with apparatus 5. The critical element here is the centrifugal effect of the rotating oil masses on both sides of the end faces 10a and 10b of piston 10. These centrifugal effects, conditioned by the rotating masses of process fluid, are all the more difficult to control if the ratios of the speeds of rotation between housing cover 13 and piston element 10 change relative to the speed of rotation at hydrodynamic component 3, in particular that of turbine wheel T, or even change their arithmetical sign. In particular, this is always the case when the speed of rotation of the driving engine increases or decreases, or if the operating mode changes from acceleration mode to deceleration mode. According to the invention, an influencing element 12 is therefore provided, which is preferably designed as a disk-shaped element 22 and is referred to as a speed plate, through which the axial force is braced against a different element, in particular housing cover 13, free of any bracing on piston element 10. To that end, influencing element 12 is situated between input E and output A spatially as close as possible to the piston, viewed in the axial direction in the installed position, and rotates synchronously with piston element 10, whereby the process fluid that is between piston element 10 and influencing element 12, in particular disk-shaped element 22, is brought to the speed of rotation of piston element 10, conditioned by dragging effects. Disk-shaped element 22 can hereby be assigned to either of the end faces 10a or 10b of the piston element. In one embodiment, in view of the available construction space between piston element 10 and a connecting element in the axial direction, element 22 is either pre-assigned to device 15 to damp vibrations or otherwise to hydrodynamic component 3.

To that end, the inner diameter di of influencing element 12 is formed by a connecting zone 19, in which a rotationally fixed connection occurs with an element 21 that is connected to piston element 10 with a rotationally fixed connection. This element 21 is formed here by a piston hub 20, which is connected to input E with a rotationally fixed connection.

FIG. 1a illustrates a design of the disk-shaped element 22 utilized according to the invention, in a so-called 3-channel power transmission system. Here the construction space, in the radial direction of the intermediate space produced by apparatus 5, which is already present between piston element 10 and device 15 is used. Disk-shaped element 22, which is preferably designed as a sheet metal element, has a maximum radial extension here which reaches into the area of the inner circumference 24 of apparatus 5, with disk-shaped element 22 being free of any contact with apparatus 5. To prevent an abrasion effect and to increase the stability of influencing element 12, the latter is preferably conical in shape, i.e., viewed in cross section it is executed with differing diameters whereby the transition may be continuous or abrupt.

Figure 1B:
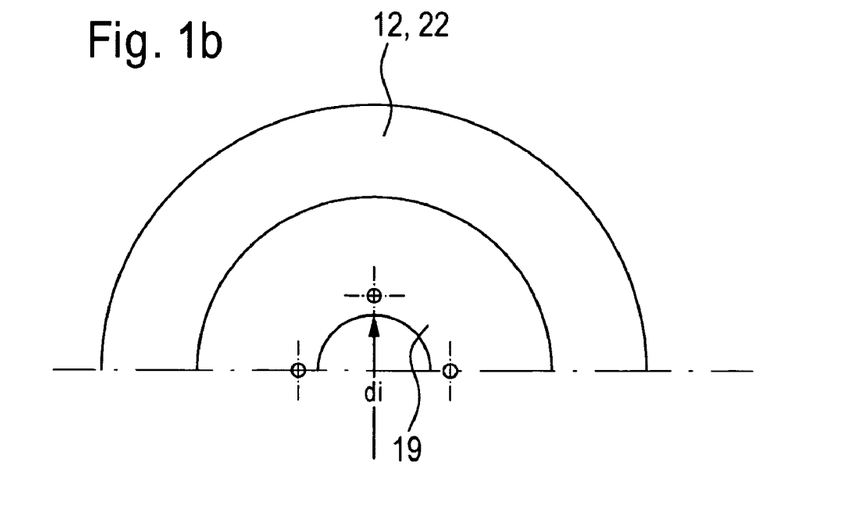
FIG. 1b: illustrates a version of an influencing element according to FIG. 1a in a view from the right.

FIG. 1b illustrates a view of disk-shaped element 22 according to FIG. 1a, from the right.

Figure 2A:
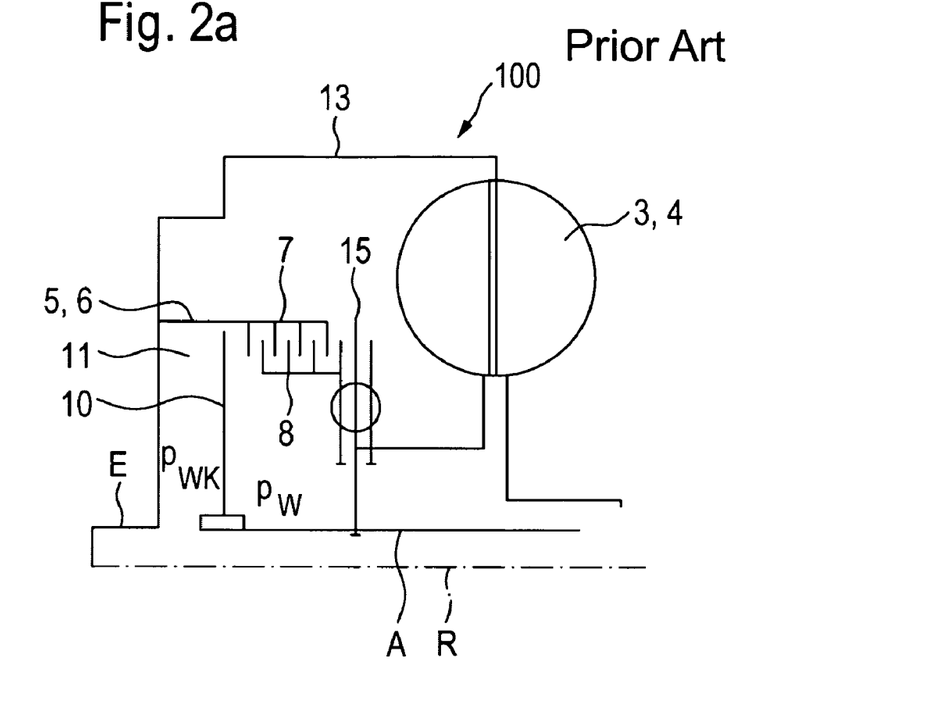
FIGS. 2a and 2b: illustrate the conditions at the piston element in a design according to the prior art.
Figure 2B:
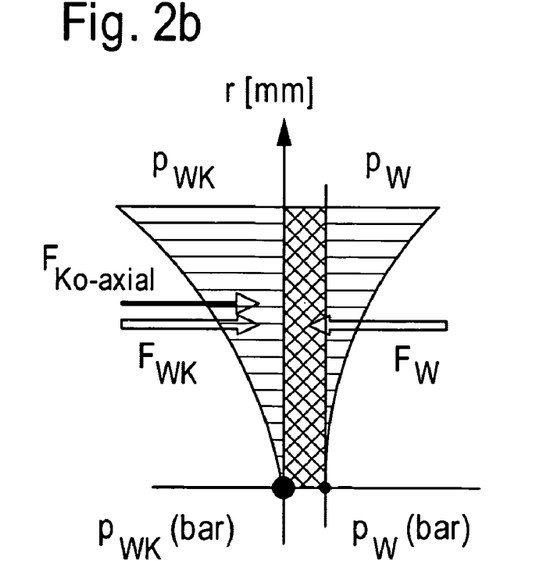

On the basis of a version of a power transmission mechanism 100 in three-channel construction according to the prior art, FIG. 2 illustrates in a schematically simplified depiction the problems that arise with regard to the different pressures on the two sides of the piston element, with the centrifugal effect of the rotating oil masses superimposed. FIG. 2a illustrates an axial section through the power transmission mechanism 100 according to the existing art. FIG. 2b illustrates for piston element 10 the pressure profile that arises for the medium found on both sides of piston element 10. The resulting axial force $F_{res-axial}$ is apparent, which no longer guarantees flawless and simple regulation of the entire power transmission mechanism, and in particular of apparatus 5 for bridging. The hydrodynamic effects in the power transmission mechanism result from differences in speed of rotation between piston element 10 and turbine wheel T, or are due to differences in speed of rotation between housing cover 13 and piston element 10, depending on the version of the power transmission mechanism. Normally, housing cover 13 and piston element 10 rotate at the same speed. If an acceleration of the hydrodynamic component occurs, a certain centrifugal oil pressure profile appears between housing cover 13 and piston element 10, depending on the speed of rotation. This is present at face 10a of piston element 10. Turbine wheel T is coupled with the transmission, however, normally an automatic transmission and thus coupled with output drive A. It is evident from this that a different speed profile will appear at face 10b of the piston element for example in the driving-off state than at face 10a. The reason for this is that for components to the right of piston element 10 the rotational speed is made up of the rotational speed of piston element 10, and thus of the engine speed and the speed of turbine T, which is rotating more slowly in this state, so that the rotating oil masses on this side are characterized by a slower speed or by a lower angular velocity $\omega$. That results in a centrifugal oil pressure profile to the right of piston element 10 which leads to lower centrifugal oil pressures $p_W$ than $p_{WK}$ to the left of piston plate 10. The average speed of rotation is lower in that case. In the existing art according to FIG. 2a, the resulting axial force $F_{res-axial}$ bears directly against piston element 10 and influences the latter's function.

Returning to FIGS. 1a and 1b, because of employment of influencing element 12, the force noted above no longer bears directly on piston element 10 but on the housing part, in particular housing cover 13, so that no negative influencing of the actuation of piston element 10 occurs here and the latter is freely addressable with regard to the contact force being set.

Figure 3A:
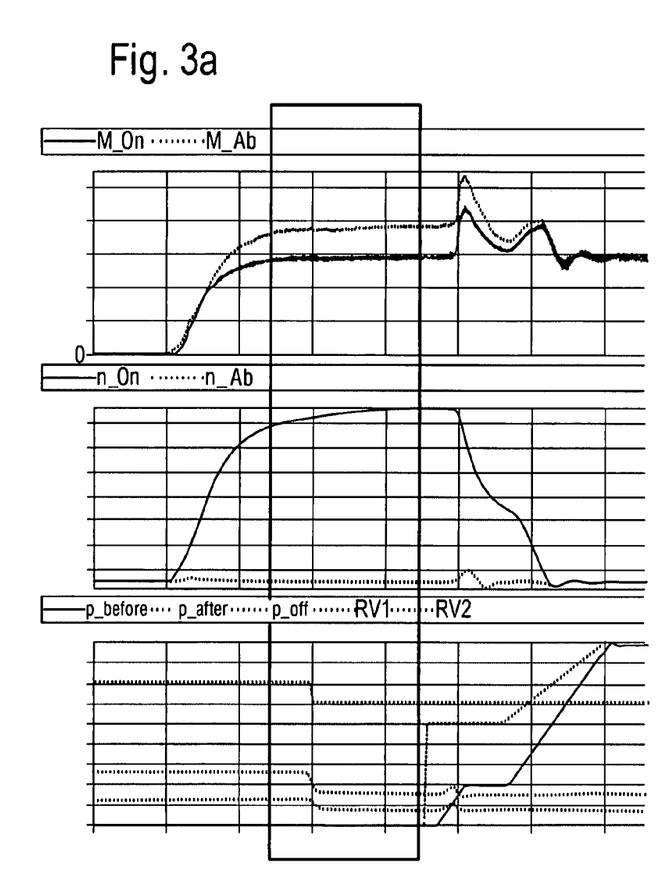
FIGS. 3a and 3b: illustrate two arrangement options for an influencing element.
Figure 3B:
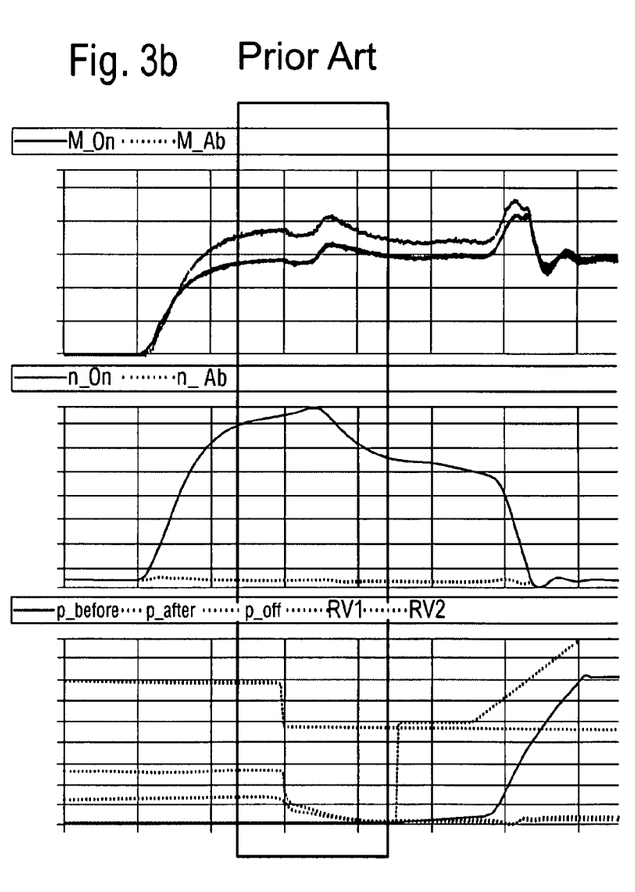

FIG. 3a illustrates conditions according to a present invention mechanism. FIG. 3b illustrates conditions according to the prior art. FIGS. 3a and 3b show rotational speed/time diagrams, pressure/time diagrams and torque/time diagrams for hydrodynamic component 3. FIG. 3a illustrates the characteristic curve as it appears under a high pressure in hydrodynamic component 3, free of any self-abrading effect of the frictionally engaged clutch because of the use of disk-shaped element 22 according to the invention. In contrast, FIG. 3b illustrates a version according to the existing art, free of such a disk-shaped element 22. It is clear that that torque jolts and torque fluctuations are undesirably more prevalent in the prior art, as shown in FIG. 3b.

Figure 4A:
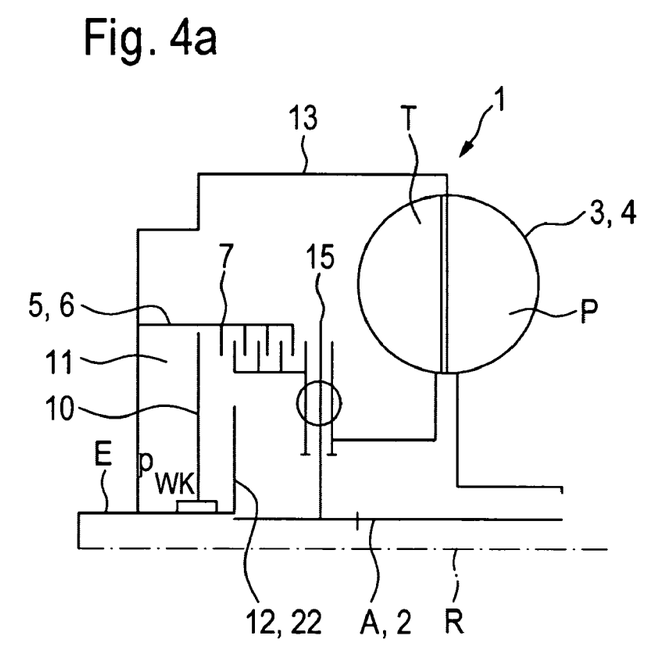
FIGS. 4a and 4b: show by way of example two possible designs of the influencing element.
Figure 4B:
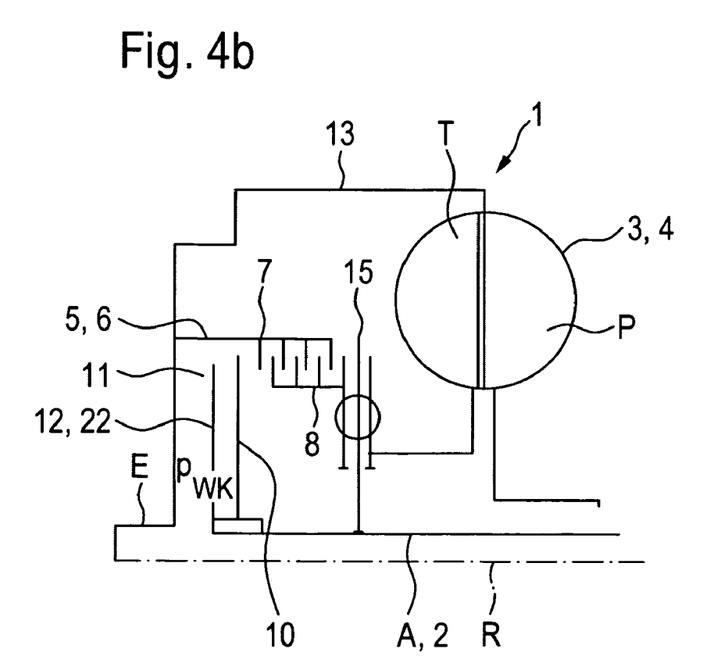

FIGS. 4a and 4b illustrate in a schematically simplified depiction two possible versions of present invention power transmission mechanism 1 with differing integration of influencing element 12, in particular of disk-shaped element 22. FIG. 4a is based on FIG. 1a. FIG. 4b represents a version with disk-shaped element 22 situated between housing cover 13 and piston element 10. As explained earlier, as much as possible of the arrangement takes place in the area of piston 10.

Disk-shaped element 22 is preferably designed as a sheet metal element, as explained earlier, since because of its slight thickness it is subjected to corresponding elasticity. Preferably, however, influencing element 12 is designed depending on a pressure differential that may possibly occur at piston element 10. Many possibilities exist for this.

Figure 5A:
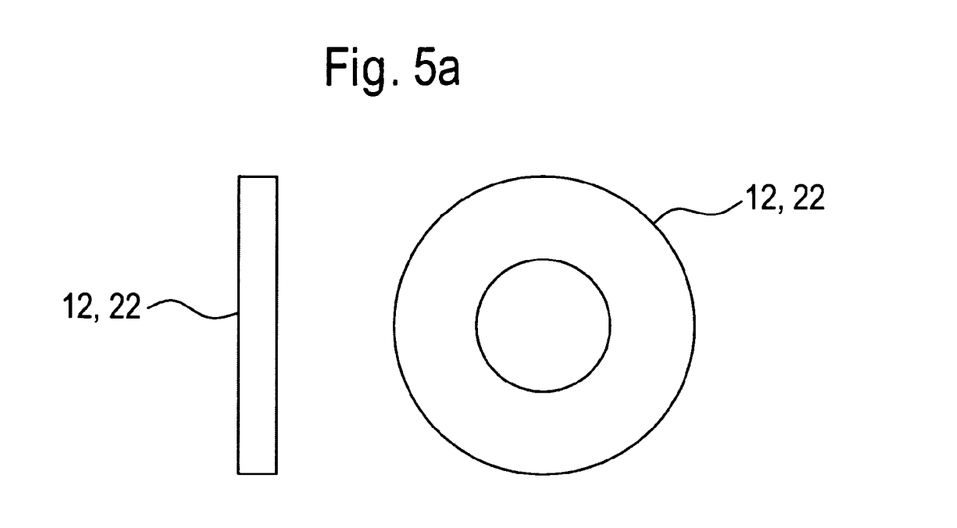
FIGS. 5a and 5b: illustrate two views of versions of the influencing element.
Figure 5B:
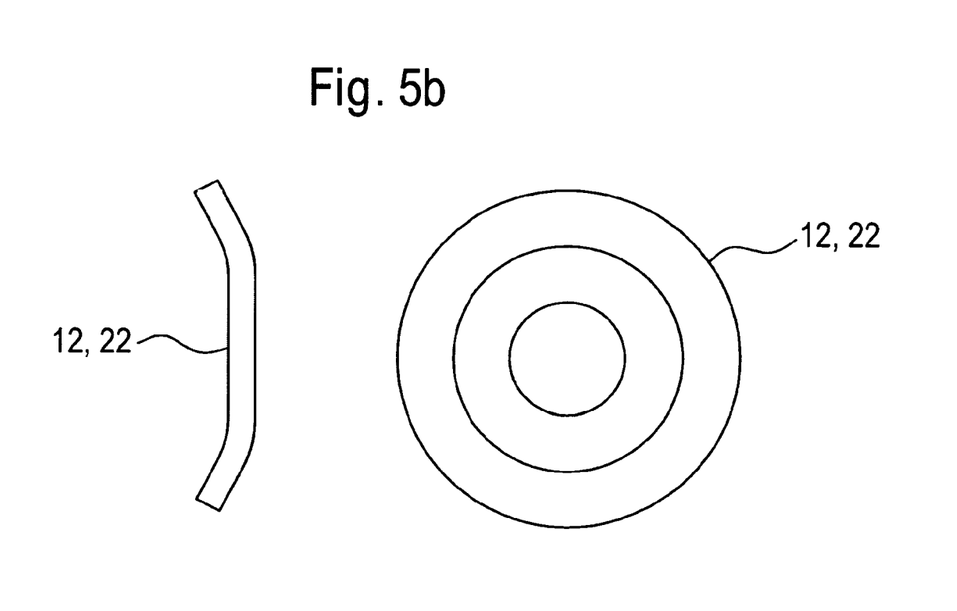

FIG. 5a illustrates a version of influencing element 12 as a ring-disk-shaped element 22 with flat surfaces facing in the axial direction. The surfaces are encircling and enclosed in the circumferential direction, i.e., no open-edge cutouts are provided in the area of the outside circumference. In contrast, FIG. 5b illustrates a version of partially conical design in the form of a sheet metal tube, i.e., with a formed surface. These versions are examples only and it should be understood that other configurations of element 12 are included in the spirit and scope of the claimed invention.

REFERENCE LABELS 1 power transmission mechanism
2 transmission input shaft
3 hydrodynamic component
4 hydrodynamic speed variator/torque converter
5 apparatus for at least partial bridging
6 switchable clutch device
7 first clutch part
8 second clutch part
9 actuating mechanism
10 piston element
10a face
10b face
11 chamber pressurizable with a pressurizing agent
12 influencing element
13 housing cover
14 interior space
15 device for damping vibrations
16 connection
17 connection
18 connection
19 connecting zone
20 piston hub
21 element
22 disk-shaped element
23 hub element
24 inner circumference
I first hydrodynamic branch
II second mechanical branch
AR working space
L guide wheel
P pump wheel
T turbine wheel
R axis of rotation
E input
A output

What is claimed is:

1. A power transmission mechanism for transmitting power between a driving engine and an output drive, comprising:
   an input and an output;
   a hydrodynamic component with a pump wheel, a turbine wheel, and a cover forming the input;
   an apparatus for at least partially bridging over the hydrodynamic component, the apparatus including a control device with a piston element that is chargeable with pressurizing agent, the piston element including an outside diameter; and,
   an influencing element for influencing a difference in speeds of rotation of moving fluids on either side of the piston element, the influencing element:
      axially located between the piston element and the turbine wheel;
      rotatable in rotational synchronicity with the piston element;
      free of any direct connection with the piston element;
      situated radially inward of the outside diameter; and,
      forming at least part of an axial space with the piston element.

2. The power transmission mechanism according to claim 1, wherein the influencing element is situated and designed in order to exhibit an axial distance from a piston element dial extension.

3. The power transmission mechanism according to claim 1, wherein the influencing element is designed as a disk-shaped or ring-disk-shaped element.

4. The power transmission mechanism according to claim 1, wherein the influencing element is designed as a conical-shaped element.

5. The power transmission mechanism according to claim 4, wherein the conical-shaped element is a formed ring-disk-shaped or sleeve-shaped element.

6. The power transmission mechanism according to claim 1, wherein the influencing element has a rotationally fixed connection with an element that has a rotationally fixed connection with the piston element.

7. The power transmission mechanism according to claim 1 further comprising at least two connections comprising a first connection coupled with a working chamber of the hydrodynamic component and a second connection coupled with a space bounded by a housing and the outer circumference of the hydrodynamic component and fillable with process fluid.

8. The power transmission mechanism according to claim 1, further comprising a 3-channel unit, comprising at least one additional connection, coupled with the space assigned to the piston element and fillable with pressurizing agent, the piston element being guided at the input or at an element rotationally fixed to the input, with a pressure-tight and fluid-tight seal.

9. The power transmission mechanism according to claim 1, further comprising a device for damping vibrations, which is situated between the piston element and the turbine wheel of the hydrodynamic component, viewed in the axial direction between input and output, and the influencing element is situated between the piston element and the device for damping vibrations, viewed in the axial direction between input and output.

10. The power transmission mechanism according to claim 1, further comprising a device for damping vibrations, which is situated between the piston element and the turbine wheel of the hydrodynamic component, viewed in the axial direction between input and output, and the influencing element is situated between the device for damping vibrations and the turbine wheel of the hydrodynamic component, viewed in the axial direction between input and output.

11. The power transmission mechanism according to claim 1, wherein the influencing element has a rotationally fixed connection with the input of the power transmission mechanism.

12. The power transmission mechanism according to claim 1, wherein the influencing element has a rotationally fixed connection with a hub element that is connected to the piston element.

13. The power transmission mechanism according to claim 1, wherein the influencing element has a rotationally fixed connection with the output of the power transmission mechanism or with an element that is coupled with the output in a rotationally fixed connection.

14. The power transmission mechanism according to claim 1, wherein the influencing element is a sheet metal component.

15. The power transmission mechanism according to claim 1, wherein the hydrodynamic component is a hydrodynamic clutch.

16. The power transmission mechanism according to claim 1, wherein the hydrodynamic component is a hydrodynamic torque converter.

* * * * *